No. 866,017. PATENTED SEPT. 17, 1907.
Z. T. GRAGG.
VEHICLE SCALE.
APPLICATION FILED FEB. 16, 1907.
3 SHEETS—SHEET 1.
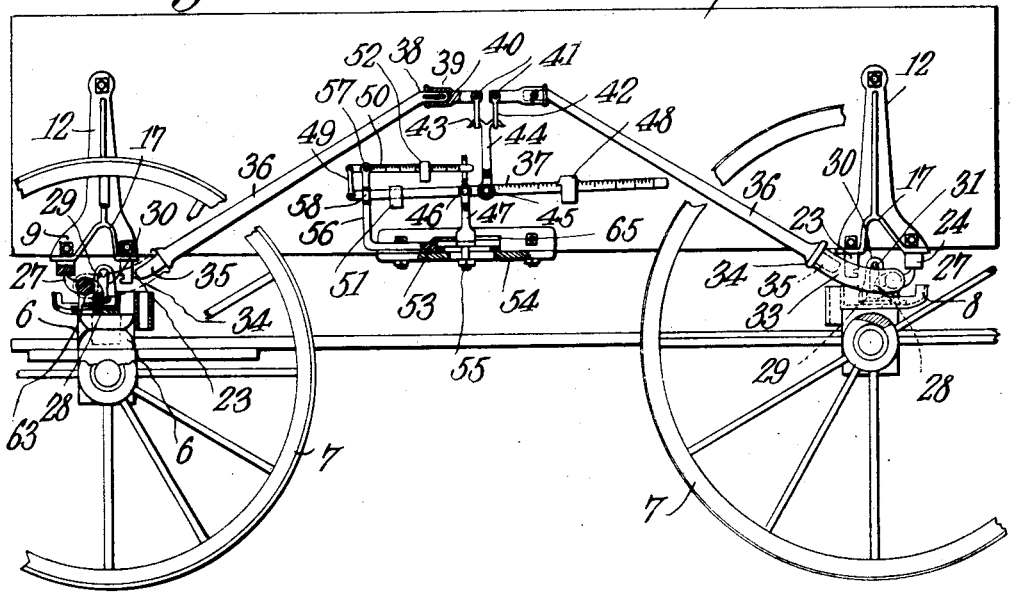
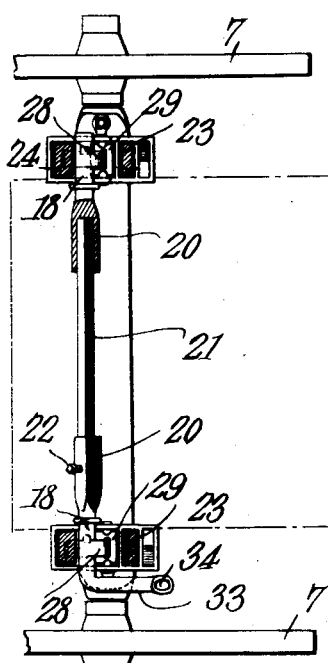
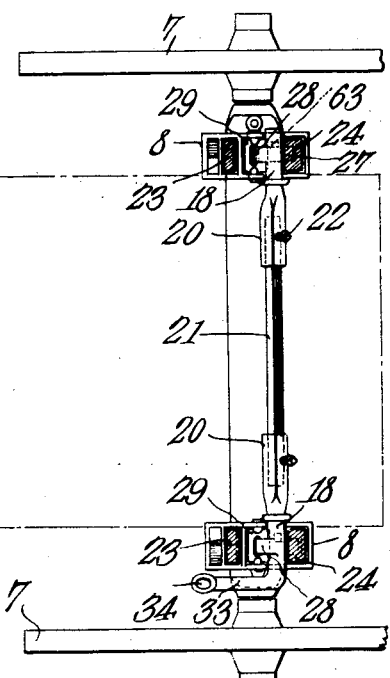
WITNESSES:
Zachary T. Gragg, INVENTOR.
By
ATTORNEYS

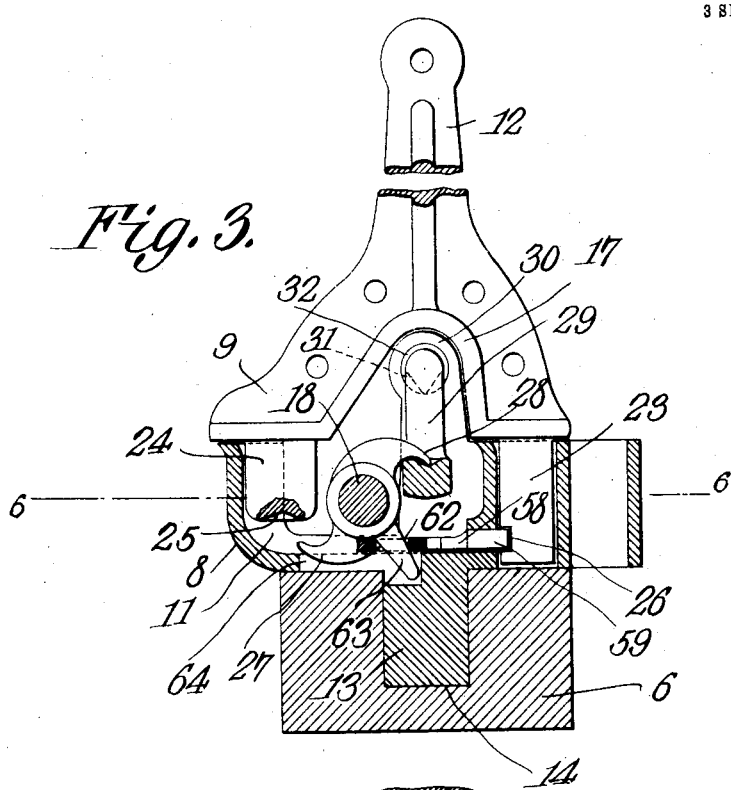
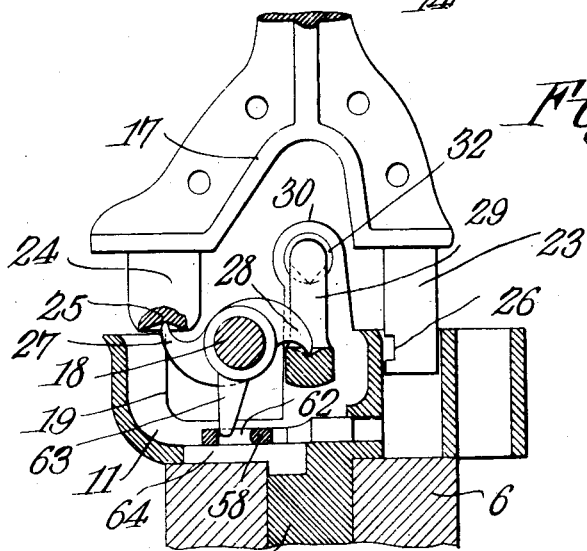

No. 866,017. PATENTED SEPT. 17, 1907.
Z. T. GRAGG.
VEHICLE SCALE.
APPLICATION FILED FEB. 16, 1907.
3 SHEETS—SHEET 3.
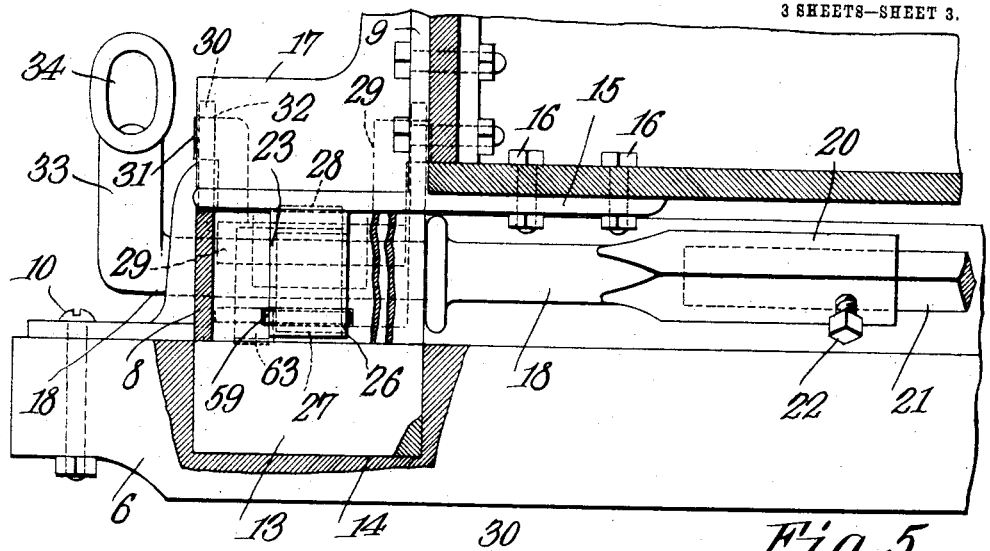
Fig. 5.
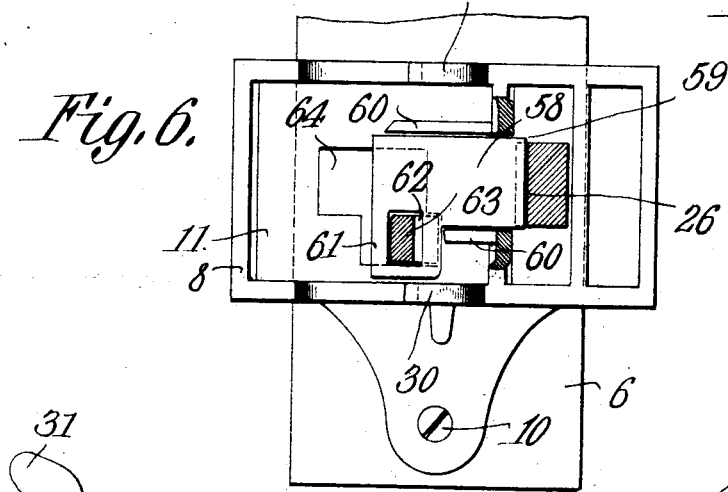
Fig. 6.
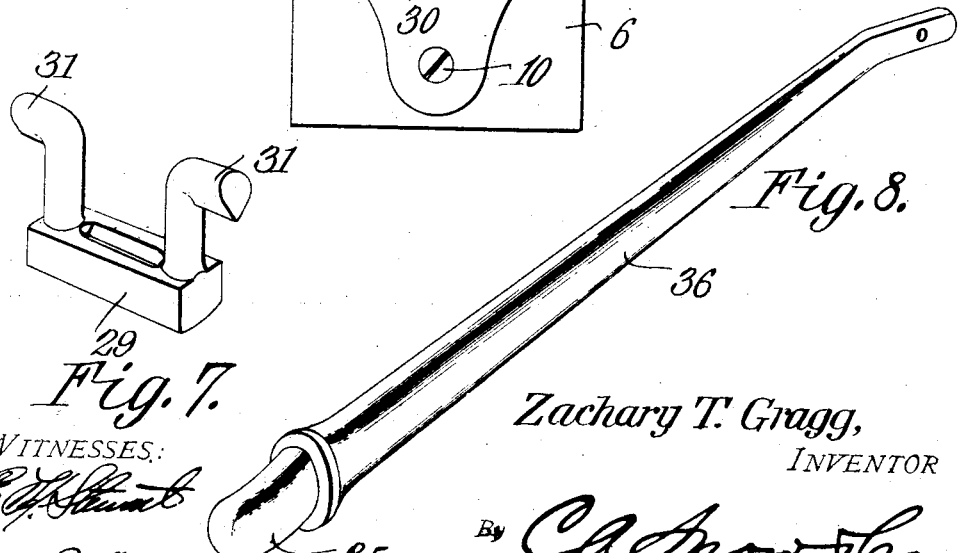
Fig. 7.
Fig. 8.
WITNESSES:
Zachary T. Gragg,
INVENTOR
By C. A. Snow & Co.
ATTORNEYS
THE NORRIS PETERS CO., WASHINGTON, D. C.

UNITED STATES PATENT OFFICE.

ZACHARY T. GRAGG, OF OKLAHOMA, OKLAHOMA TERRITORY, ASSIGNOR TO UNITED STATES PORTABLE WAGON SCALES & NOVELTY MANUFACTURING COMPANY, A CORPORATION.

VEHICLE-SCALE.

No. 866,017.  Specification of Letters Patent.  Patented Sept. 17, 1907.

Application filed February 16, 1907. Serial No. 357,723.

*To all whom it may concern:*

Be it known that I, ZACHARY T. GRAGG, a citizen of the United States, residing at Oklahoma city, in the county of Oklahoma and Territory of Oklahoma, have invented a new and useful Vehicle-Scale, of which the following is a specification.

This invention relates to weighing attachments for cars, wagons and other vehicles and has for its object to provide improved means whereby the weight of the load or contents of the vehicle may be conveniently and accurately determined.

A further object of the invention is to provide means whereby the rocking or lifting bars of the weighing mechanism may be adjusted laterally thereby to accommodate vehicle bodies of different widths, and further to provide improved means for detachably connecting the operating levers with the lifting bars, and scale beam, respectively.

A further object is to provide a plurality of sectional fulcrum boxes for attachment to the wagon body and bolsters, respectively, and further to provide means for locking the boxes in closed or inoperative position, and means for releasing the locking means and separating said boxes when the operating levers are connected with the scale beam.

A further object is to provide one of the sections of each fulcrum box with a pivoted yoke for engagement with the double eccentric levers on the lifting bars thereby forming a swinging fulcrum and serving to reduce friction between the several parts to a minimum.

A further object is to provide the weighing beam with an auxiliary or tare beam so that the weight of the wagon body may be determined independently of the load and without the employment of the usual swinging weights or poises.

A still further object of the invention is to generally improve this class of devices so as to increase their utility, durability and efficiency.

Further objects and advantages will appear in the following description and illustrated in the accompanying drawings, it being understood that various changes in form, proportions and minor details of construction may be resorted to within the scope of the appended claims.

In the accompanying drawings forming a part of this specification: Figure 1 is a side elevation of a wagon provided with weighing mechanism constructed in accordance with my invention, the scale and its associated parts being shown in position for weighing the load. Fig. 2 is a top plan view partly in section with the wagon body or box removed. Fig. 3 is a front elevation partly in section of one of the sectional fulcrum boxes showing the sections of said box in lowered or locked position. Fig. 4 is a similar view showing the sections of the box separated and in position for weighing the load. Fig. 5 is a transverse sectional view partly in elevation of one corner of the vehicle. Fig. 6 is a transverse sectional view taken on the line 6—6 of Fig. 3 showing the construction of the locking mechanism. Fig. 7 is a perspective view of one of the swinging yokes or fulcrums. Fig. 8 is a similar view of one of the connecting levers.

Similar numerals of reference indicate corresponding parts in all of the figures of the drawings.

The improved weighing mechanism may be used in connection with wagons, cars, platforms and the like and by way of illustration is shown attached to a farm wagon of the ordinary construction in which 5 indicates the wagon body or box, 6 the bolsters and 7 the traction wheels.

Secured to the opposite ends of the front and rear bolsters 6 are fulcrum boxes each preferably formed in two sections 8 and 9, the lower section 8 of each box being rigidly secured to the adjacent bolster 6, as by a bolt 10, while the upper section 9 is mounted for vertical movement in the chamber or compartment 11 of the lower section and is provided with a vertical extension 12 for attachment to the vehicle body, as shown. The lower section of each box is further retained in position by a depending lug 13 which engages a correspondingly shaped opening or socket 14 formed in the adjacent end of the bolster and thus assists in preventing accidental displacement of said lower section. The upper section 9 is provided with a laterally projecting arm 15 which extends beneath the bed of the wagon body and is rigidly secured thereto in any suitable manner, as by bolts or rivets 16.

Cast or otherwise formed integral with the upper section 9 is an extension or hood 17 which forms a closure or housing for the adjacent lower section when said sections are assembled.

Extending transversely across the bottom of the wagon bed are rock shafts or lifting members 18 the opposite ends of which are journaled in suitable cut away portions or bearings 19 formed in the lower section 8, said lifting members being preferably formed in sections and provided at their inner ends with squared sockets 20 for the reception of a connecting bar 21. The bar 21 engages the interior walls of the sockets 20 and is clamped in position by means of suitable set screws 22.

It will thus be seen that by adjusting the bars 18 longitudinally of the connecting bar 21 the lifting members may be lengthened or shortened so as to accommodate wagon bodies of different widths.

Depending from the upper section 9 of each sectional fulcrum box are spaced lugs or projections 23 and 24 one of which is provided with a terminal substantially V shaped recess 25 while the opposite lug is provided with an inwardly extending locking recess 26 for the purpose hereinafter referred to.

Secured to or formed integral with the rock shafts or lifting members 18 are double eccentric actuating levers or lugs 27 and 28 one of which engages the recess 25 while the opposite eccentric lug bears against a swinging yoke or fulcrum 29. The yoke or fulcrum 29 is pivotally mounted for lateral movement in spaced upstanding ears 30 preferably formed integral with the lower box section 8, said yoke being provided with oppositely disposed trunnions 31 the knife edge of which is mounted in suitable bearings 32 formed in the ears 30. It will thus be seen that when the lifting member or bar 18 is partially rotated the eccentric lug 28 will bear against the yoke 29 while the lug 27 will engage the recess 25 and thus separate the sections comprising the sectional fulcrum box so that the entire weight of the vehicle body will be supported on the eccentric lugs.

The lifting members or bars 18 are provided with angular extensions or arms 33 having sockets 34 in the free ends thereof for the reception of the curved or deflected ends 35 of suitable weighing or connecting levers 36, the latter forming a pivotal connection between the lifting members or bars 18 and the scale beam 37.

The upper ends of the lever 36 are deflected laterally at 38 to form substantially horizontally disposed extensions 39 and slidably mounted on said extensions are tubular members or sleeves 40 whereby the levers 36 may be adjusted to accommodate vehicles of different lengths.

Pivotally mounted at 41 on the inner ends of the sleeves 40 are depending hangers 42 which engage the hooked ends 43 of a suspension bar 44, the latter being pivotally connected with the scale beam 37, as indicated at 45.

The weighing beam 37 is fulcrumed at 46 on an adjustable upright or standard 47 and is provided at one end thereof with a sliding weight or poise 48 while its opposite end is pivotally connected through the medium of a link 49 with an auxiliary or tare beam 50, there being suitable weights or poises 51 and 52 slidably mounted on the beams 37 and 50, as shown.

It will thus be seen that by adjusting the weight or poise 48 on the scale beam 37 the weight of the load may be readily determined and that after said load has been removed from the wagon box the weight of the wagon body may be ascertained by adjusting the poise 52 on the beam 50. When the load is exceptionally heavy the additional weight thereof may be ascertained by means of the auxiliary beam 50, said beam being preferably graduated to indicate pounds and fractions thereof in the usual manner.

The standard 47 is slidably mounted on a supporting plate 53 secured to the foot rail 54 of the wagon box, said supporting plate being provided with a clamping nut 55 which extends through the foot rail and supporting plate for engagement with the standard whereby the latter may be locked in adjusted position.

One end of the supporting plate 53 is bent upwardly to form a vertically disposed arm 56 the upper end of which is pivotally connected at 57 to the tare beam 50, there being a loop or eye 58' formed in the upright 56 thereby to permit free tilting movement of the main scale beam.

As a means for locking the sections of each fulcrum box in contact with each other and in position on the bolster 6 of the wagon there is provided a sliding bolt or locking member 58, the latter being seated within the compartment 11 of the lower section and provided with a locking lip 59 adapted to enter the notch or recess 26 in the lug 23 when the upper section is in lowered position and thus effectually prevent vertical movement of the same.

The locking member 58 is slidably mounted between suitable guide flanges 60 and is provided with a laterally extending arm 61 the inner end of which is spaced from the adjacent vertical wall of the lower section 8 of the fulcrum box, as shown.

The arm 61 is provided with a longitudinally disposed slot 62 adapted to receive an actuating lug or projection 63 projecting from the rocking bar or lifting member 18, so that when said bar is partially rotated the initial movement of the locking lug 63 will engage the walls of the slot 62 and withdraw the locking lip 59 from engagement with the recess 26, and a further movement of the rocking bar cause the eccentric lugs 27 and 28 to bear against the yoke and projection 24, respectively, and thus elevate the upper section of the box so that the weight of the wagon body will be sustained directly by the rocking bars, whereby when the levers 36 are placed in position the weight of the load may be readily ascertained by reference to the scale beams.

Attention is called to the fact that the rock shafts or lifting members 18 are free to move vertically within the bearing 19 when the levers 36 are connected with the scale beam, there being suitable slots or recesses 64 formed in the bottom of the lower section of each fulcrum box to permit free movement of the eccentric lugs when said bars are actuated.

It will also be observed that the depending projection 24 is shorter than the projection 23 so as to permit the lug 63 to release the locking bolt from engagement with the recess 26 before the eccentric lug or lever 27 engages and elevates the projection 24.

When it is desired to weigh the load or contents of the wagon body the head of the standard 47 is inserted between the guide flanges 65 of the support 53 and secured in position by means of the clamping nut 55 after which the levers 36 are inserted in the sockets 34 in the arms 33 and the adjustable sleeves or collars 40 connected to the hooks 43 through the medium of links by exerting a downward pressure on said collars.

As the operating levers 36 are forced downwardly into engagement with the hooks 43 the lifting members or rock shafts 18 will be partially rotated thereby causing the lugs 63 to withdraw or release the locking members from engagement with the locking recess 26 and at the same time cause the eccentric levers or lugs to engage the bearings in the projections 24 and yoke 29, respectively, and elevate the movable sections of the supporting boxes together with the wagon box to the position shown in Figs. 1 and 4 of the drawings,—that is to say in position to weigh the load. After the gross weight is thus obtained the load is removed from the wagon and the latter weighed, the weight of the wagon being subtracted from the gross weight to determine the net weight or load of grain or other material in the vehicle.

The attachment is readily disconnected by removing the levers 36 which permits the movable box sections carrying the wagon body to return to the position shown in Fig. 3, the support 53 and standard 47 being subsequently detached and together with the levers 36 placed within the wagon box for further use.

By forming the lifting members or bars 18 in a plurality of sections said bars may be readily adjusted transversely of the vehicle so as to accommodate wagon beds of different widths while by reason of the sleeves 40 the levers 36 may be adjusted to accommodate wagon beds of different lengths.

It will also be observed that the pivoted yokes by engagement with the eccentric lugs or levers on the rocking or lifting bars form swinging fulcrums and thus serve to reduce friction between the several parts to a minimum.

While the weighing mechanism is particularly designed for attachment to farm wagons, it is obvious that the same may be used with equally good results in connection with trucks, drays, carts, cars and a great variety of vehicles with but very slight modifications and without departing from the spirit of the invention.

From the foregoing description it is thought that the construction and operation of the device will be readily understood by those skilled in the art and further description thereof is deemed unnecessary.

Having thus described the invention what is claimed is:

1. In weighing mechanism, the combination with a vehicle body, of the running gear, sectional fulcrum boxes secured to the running gear and having a section of each box secured to the vehicle body, means disposed within the boxes and forming fulcrums, a scale beam, means for locking the vehicle body to the running gear, and means forming a pivotal connection between the fulcrums and scale beam for releasing the locking means and elevating the vehicle body.

2. In weighing mechanism, the combination with a vehicle body, of the running gear, sectional fulcrum boxes carried by the running gear and having a section of each box secured to the vehicle body, means disposed within the boxes and forming fulcrums, a scale beam, means for securing the sections of each box in locked position, and a connection between the fulcrum and scale beam for releasing the boxes and elevating the vehicle body.

3. In weighing mechanism, the combination with a vehicle body, of the running gear, sectional fulcrum boxes carried by the running gear and having a section of each box secured to the vehicle body, longitudinally adjustable lifting members disposed within the boxes and forming fulcrums, a scale beam, means for locking the vehicle body to the running gear, and means forming a pivotal connection between the lifting members and scale beam for releasing the locking means and elevating the vehicle body.

4. In weighing mechanism, the combination with a vehicle body, of the running gear, sectional fulcrum boxes carried by the running gear and having a section of each box secured to the vehicle body, lifting bars journaled in the boxes and formed of a plurality of adjustable telescopic sections, means for locking the sections in adjusted position, a scale beam, means for securing the sections of each box in locked position, and levers forming a pivotal connection between the lifting bars and scale beam for releasing the locking means and elevating the vehicle body.

5. In weighing mechanism, the combination with a vehicle body, of the running gear, sectional fulcrum boxes carried by the running gear and having a section of each box secured to the vehicle body, one of the sections of each box being provided with a depending lug having a locking recess formed therein, means disposed within the boxes and forming fulcrums, bolts adapted to engage the recesses in the depending lugs for locking the sections of the fulcrum boxes in engagement with each other, a scale beam, and means forming a pivotal connection between the fulcrum and scale beam for releasing the bolts and elevating the vehicle body.

6. In weighing mechanism, the combination with a vehicle body, of the running gear, sectional fulcrum boxes carried by the running gear and having a section of each box secured to the vehicle body, longitudinally extensible rock shafts disposed within the boxes, means carried by the rock shafts and forming fulcrums, a scale beam, and levers connecting the rock shafts with the scale beam.

7. In weighing mechanism, the combination with a vehicle body, of the running gear, sectional fulcrum boxes secured to the running gear and having a section of each box secured to the vehicle body, vertically movable rock shafts disposed within the boxes, means carried by the rock shafts and forming fulcrums, means for locking the sections of the fulcrum boxes in closed position, a scale beam, and levers connecting the rock shafts with the scale beam for releasing the locking means and subsequently elevating the vehicle body.

8. In weighing mechanism, the combination with a vehicle body, of the running gear, sectional fulcrum boxes secured to the running gear and having a section of each box secured to the vehicle body, rock shafts disposed within the boxes, means carried by the rock shafts and forming fulcrums, said rock shafts being provided with angularly disposed crank arms having sockets formed therein, a scale beam, and detachable levers one of each of which is operatively connected with the scale beam and the opposite end thereof seated in the socket of the adjacent crank arm for elevating the vehicle body.

9. In weighing mechanism, the combination with a vehicle body, of the running gear, sectional fulcrum boxes secured to the running gear and having a section of each box secured to the vehicle body, a yoke pivotally mounted for swinging movement in one of the sections of each box, longitudinally extensible rock shafts having double eccentric levers adapted to engage the yoke and upper section of each box, respectively, a scale beam, and levers forming a pivotal connection between the scale beam and rock shafts for elevating the vehicle body.

10. In weighing mechanism, the combination with a vehicle body, of the running gear, fulcrum boxes carried by the running gear and provided with vertically movable sections for attachment to the vehicle body, means disposed within the boxes and forming fulcrums, a scale beam, means for locking the sections of each box in closed position, and levers forming a connection between the fulcrums and scale beam, said levers serving to release the locking means and elevate the vehicle body when said levers are connected with the scale beam.

11. In weighing mechanism, the combination with a vehicle body, of the running gear, sectional fulcrum boxes secured to the running gear, and having a section of each box secured to the vehicle body, means carried by one section of each box and adapted to engage the adjacent section for locking said sections in closed position, fulcrums disposed within the boxes and operatively connected with the locking means, a scale, and levers forming a pivotal connection between the scale and fulcrums.

12. In weighing mechanism, the combination with a vehicle body, of the running gear, sectional fulcrum boxes secured to the running gear and having a section of each box secured to the vehicle body, a yoke pivotally mounted on the lower section of each box, shafts provided with double eccentric levers adapted to engage the yoke and upper section of each box, respectively, means operatively connected with the rock shafts for locking the box sections in closed position, a scale beam, and levers forming a pivotal connection between the scale beam and rock shafts.

13. In weighing mechanism, the combination with a vehicle body, of the running gear, sectional fulcrum boxes secured to the running gear and having a section of each box secured to the vehicle body and the opposite section provided with a locking recess, rock shafts disposed within the boxes, means carried by the rock shafts and forming fulcrums, a locking bolt adapted to engage the recess in said section, lugs depending from the rock shafts and operatively connected with the bolts, a scale beam, and levers forming a pivotal connection between the rock shafts and scale beam.

14. In weighing mechanism, the combination with a vehicle body, of the running gear, sectional fulcrum boxes secured to the running gear and having one section of each box secured to the vehicle body, and the adjacent section provided with a locking recess, a bolt adapted to enter the recess and provided with a slot, rock shafts disposed within the boxes, means carried by the rock shafts and forming fulcrums, lugs depending from the rock shafts and operating within the slots for moving the bolts to operative and inoperative positions, a scale beam, and levers forming a pivotal connection between the fulcrums and scale beam.

15. In weighing mechanism, the combination with a vehicle body, of the running gear, sectional fulcrum boxes secured to the running gear and having a section of each box secured to the vehicle body, spaced ears formed in the lower section of each box, a yoke pivotally mounted for swinging movement in said ears, rock shafts seated within the fulcrum boxes and provided with double eccentric levers adapted to engage the yokes and upper box sections, respectively, a scale beam, and levers forming a pivotal connection between the scale beam and rocking bars.

16. In weighing mechanism, the combination with a vehicle body, of the running gear, sectional fulcrum boxes secured to the running gear and having a section of each box secured to the vehicle body, a locking recess formed in the upper section of each box, guiding flanges carried by the lower section of each box, bolts slidably mounted between the guiding flanges and adapted to engage the recesses for locking the sections in closed position, rock shafts disposed within the boxes, means carried by the rock shafts and forming fulcrums, lugs carried by the rocking bars and operatively connected with the bolts for moving the same to operative and inoperative position, a scale beam, and levers forming a pivotal connection between the scale beam and rock shafts.

17. In weighing mechanism, the combination with a vehicle body, of the running gear, sectional fulcrum boxes carried by the running gear and having a section of each box secured to the vehicle body, rock shafts disposed within the boxes, means carried by the rock shaft and constituting fulcrums, said rock shafts having their inner ends provided with terminal sockets, connecting bars seated in said sockets, adjusting screws passing through the sockets and engaging connecting bars, a scale beam, and levers forming a pivotal connection between the scale beam and rock shafts.

18. In weighing mechanism, the combination with a vehicle body, of the running gear, sectional fulcrum boxes secured to the running gear and having a section of each box secured to the vehicle body, longitudinally adjustable rock shafts arranged within the boxes and each having one end thereof provided with an angularly disposed crank arm having a socket formed therein, a scale beam, and levers each having one end thereof seated in the socket of the adjacent crank arm and its opposite end operatively connected with the scale beam.

19. In weighing mechanism, the combination with a vehicle body, of the running gear, sectional fulcrum boxes secured to the running gear and having a section of each box secured to the vehicle body and provided with a laterally extending hood forming a closure for the adjacent section, vertically movable rock shafts disposed within the boxes, means carried by the rock shafts and forming fulcrums, a scale beam, and a connection between the scale beam and the rock shafts.

20. In weighing mechanism, the combination with a vehicle body, of the running gear, sectional fulcrum boxes secured to the running gear and having a section of each box secured to the vehicle body, the lower section of each box being provided with a bearing and the upper section formed with a locking recess, rock shafts mounted for vertical movement in said bearings, means carried by the rock shafts and forming fulcrums, a bolt slidably mounted in one of said sections and adapted to engage a locking recess for locking said sections in closed position, lugs depending from the rock shafts and operatively connected with the bolts for actuating the latter, a scale beam, and levers forming a pivotal connection between the scale beam and rock shafts.

21. In weighing mechanism, the combination with a vehicle body, of the running gear, sectional fulcrum boxes carried by the running gear and each having one section thereof provided with a rigid contact member, and the opposite section provided with a movable contact member, rock shafts disposed within the boxes and provided with double eccentric levers adapted to engage the movable and stationary contact members, a scale beam, and levers forming a connection between the scale beam and rock shafts.

22. In weighing mechanism, the combination with a vehicle body, of the running gear, sectional fulcrum boxes carried by the running gear, one of the sections of each box being secured to the adjacent bolsters and provided with a movable contact, and the adjacent box secured to the vehicle body and provided with a rigid contact and locking recess, rock shafts disposed within the boxes and provided with double eccentric levers adapted to engage the relatively stationary and movable contacts, a locking member adapted to engage the recess for locking the sections in closed position, lugs depending from the rock shafts and operatively connected with the bolts for actuating the latter, a scale beam, and levers forming a pivotal connection between the scale beam and rock shafts.

23. In weighing mechanism, the combination with a vehicle body, of the running gear, sectional fulcrum boxes secured to the running gear and having a section of each box secured to the vehicle body, rock shafts disposed within the boxes, means carried by the rock shafts and forming fulcrums, a main scale beam, an auxiliary beam operatively connected therewith, a hanger secured to the main beam, and levers forming a pivotal connection between the hangers and the rock shaft.

24. In weighing mechanism, the combination with a vehicle body, of the running gear, sectional fulcrum boxes secured to the running gear and having a section of each box secured to the vehicle body, rock shafts disposed with the boxes, means carried by the rock shafts and forming fulcrums, a standard adjustable longitudinally of the vehicle body, and a main scale beam fulcrumed on the standard, an auxiliary scale beam associated with the main beam, a hanger pivotally connected with the main beam, levers detachably secured to the rock shafts, collars adjustable longitudinally of the levers, and links forming a pivotal connection between the collars and hanger.

In testimony that I claim the foregoing as my own, I have hereto affixed my signature in the presence of two witnesses.

ZACHARY T. GRAGG.

Witnesses:
S. A. HORTON,
A. O. GROVES.